United States Patent [19]
Creager et al.

[11] Patent Number: 5,090,740
[45] Date of Patent: Feb. 25, 1992

[54] INTEGRAL MANIFOLD

[76] Inventors: Richard F. Creager, 19723 Maple, Conklin, Mich. 49403; Mark Blanding, 5830 Bancroft Ave., SE., Alto, Mich. 49302; Jack VanRhee, 3484 Millshaft Ct., Caledonia, Mich. 49316; Walter R. Hartuniewicz, 206 Leyden, SW., Grand Rapids, Mich. 49504

[21] Appl. No.: 317,825

[22] Filed: Mar. 1, 1989

[51] Int. Cl.$^5$ .............................. F16L 3/00
[52] U.S. Cl. ..................... 285/61; 285/93; 285/150; 285/422
[58] Field of Search ............... 285/150, 64, 61, 62, 285/156, 155, 131, 132, 62, 422; 137/597

[56] References Cited

U.S. PATENT DOCUMENTS

| | | |
|---|---|---|
| 1,147,664 | 7/1915 | Ward .................... 285/150 |
| 1,254,238 | 1/1918 | Kelly .................... 285/61 |
| 1,521,809 | 1/1925 | Green . |
| 1,678,640 | 1/1928 | Hall . |
| 2,062,449 | 12/1936 | Dick .................... 285/62 |
| 2,106,404 | 1/1938 | Ewing . |
| 2,344,424 | 3/1944 | Singleton . |
| 2,441,204 | 5/1948 | Nusbaum ............... 285/150 X |
| 2,518,292 | 8/1950 | Anglis ................. 285/150 X |
| 2,519,203 | 8/1950 | Stoecklin ............. 285/61 |
| 2,650,556 | 9/1953 | Turner ................ 285/150 X |
| 2,680,632 | 6/1954 | Spieth . |
| 3,185,500 | 5/1965 | Luther . |
| 3,291,507 | 12/1966 | Clay . |
| 3,314,696 | 4/1967 | Ferguson et al. . |
| 3,451,434 | 6/1969 | Bauer, Jr. . |
| 3,562,377 | 2/1971 | Zetzsche . |
| 3,760,842 | 9/1973 | Mikiya ................ 285/155 X |
| 4,305,608 | 12/1981 | Stuemky et al. ........ 285/259 X |
| 4,772,051 | 9/1988 | Mann .................. 285/62 |

FOREIGN PATENT DOCUMENTS 741624 12/1955 United Kingdom .......... 285/61

OTHER PUBLICATIONS

Manastrip Corp., Rexford, N.Y. 12148, Series 1000, Series 2000, Series 3000, and Series 5000 manifolds.
Manifold Systems, Inc., Fenton, MO 63026, Manifolds A La Carte, Examples.
Al-Ko nylon manifolds.
Hydro-craft, Inc., Hydro-E low pressure water-air manifold.

Primary Examiner—Dave W. Arola
Attorney, Agent, or Firm—Price, Heneveld, Cooper, DeWitt & Litton

[57] ABSTRACT

An aluminum manifold (10) is provided of prismoid shape which is octagonal in cross section and has eight planar surfaces (52). An integral collet (18) is formed between two annular shoulders (22, 26) near one end to facilitate clamping the manifold (10) with a conventional clamping assembly (16). Grooves (56) extend longitudinally along centerlines of the planar surfaces (52). Ports (54) adapted to connect to standard industrial fittings are located on centerlines of adjacent surfaces (52) in open communication with a central bore (28) extending through the manifold (10).

9 Claims, 2 Drawing Sheets

INTEGRAL MANIFOLD

BACKGROUND OF THE INVENTION

1. Field of the Invention

The invention relates to manifolds for directing fluids (including gases) through multiple ports and, more particularly, to certain structural configurations and construction of such manifolds.

2. Description of the Prior Art

In many industrial applications, it is necessary to direct fluids from a single source to multiple areas of application. For purposes of the description of the prior art, and for purposes of describing an illustrative embodiment of a manifold in accordance with the invention, the use of the term "fluids" shall include not only materials in their liquid state, but also materials in a gaseous state, such as air or the like. Correspondingly, it is also frequently required to direct fluids from multiple areas into a common or single area. For example, various types of machinery often require cooling water to be directed from a central reservoir to multiple areas of the application, and further require a return of the water after it has flowed through or around various machinery components to be cooled.

Still further, it is common in various industries, such as the automotive manufacturing industry, to utilize relatively large machinery having a plurality of "work stations." For example, in the automotive manufacturing industry, it is relatively common to employ welding machinery comprising a number of individual welding work stations. At each of these work stations, one or more outlets of compressed air or other gases may be required, commonly known as air cylinders. For purposes of providing the gases to the work stations and cylinders, the machinery may include a single source (or a number of sources fewer than the number of cylinders) of the compressed air or other gases for application to the work stations. In these types of arrangements, it is known to employ manifolds for directing the compressed air or other gases from the main sources through multiple ports in the manifolds. In turn, the multiple ports are typically connected to conduits for directing the compressed air or other gases to the individual work stations and cylinders.

Known manifolds are frequently constructed of hollow cylindrical pipe having a plurality of tapped apertures extending through the wall of the pipe. One end of the pipe may be capped, while the other end of the pipe is adapted to engage a fitting for securing the manifold to a fluid source. Each of the apertures on the cylindrical portion of the manifold provides a port to receive a conventional fitting which, in turn, is connectable to a conduit. Each port can either be plugged or provided with a fitting for connecting to the conduit, depending upon the number of conduits needed.

Although manifolds having structural configurations and constructions in accordance with the foregoing description have been utilized in a number of industrial applications for a substantial period of time, several structural and functional disadvantages exist with respect to these types of manifolds. For example, with the use of relatively conventional and cylindrical pipe, the thickness of the pipe wall is often insufficient at the areas surrounding the ports to maintain requisite structural strength and "fluid-tight" or "gas-tight" joints with the conduit fittings. In addition, the known manifolds constructed of hollow cylindrical pipe typically comprise steel materials. Such steel pipe is often subject to substantial corrosion, which may ultimately weaken the manifold, particularly if the manifold is subjected to relatively high fluidic pressures.

Other types of manifolds which provide some technical advantages over cylindrical pipe manifolds are also known and commercially available. For example, certain types of manifolds manufactured by Hydro-Craft, Inc., are constructed of light weight and corrosion-resistant plastic or nylon materials. These manifolds have "built-up" ports extending from the cylindrical portions of the manifolds. Although these manifolds provide certain structural and functional advantages over the conventional cylindrical pipe manifolds constructed of steel, the plastic or nylon manifolds can present problems with respect to utilization with high-pressure fluids. In addition, such manifolds also tend to be relatively expensive. Further, if requisite structural strength is to be maintained, the sizes of these manifolds are somewhat limited. Correspondingly, the number of usable ports per manifold is also limited.

Other known manifolds are constructed of one-piece aluminum in prismatoid configurations, with a closed end and central bore extending longitudinally through the manifold, the end opposite the closed end being machined in a manner to accommodate attachment to the source. Multiple taps are provided through the wall extending from external flat or planar surfaces into the central bore. The known shapes for such manifolds are either square in cross section or hexagonal in cross section. These manifolds can withstand relatively high pressure and high flow volume of gases or fluids, but due to the one-piece method of forming are expensive to use in a wide variety of applications.

It is often desirable to mount manifolds in multiple configurations where, for example, one may be provided as a source of supply to the multiple conduits, and another may be provided as a source of return to the source. For this purpose, Hydro-Craft, Inc. manufactures clamps which are adapted to mount manifolds side by side. Existing manifolds, however, are not readily adapted to mount in such clamps without mounting additional fittings to the manifolds.

Standard industrial fittings to be used in the ports of manifolds are commercially available and used in essentially three configurations: straight (0°), 45° and 90° fittings. It is desirable to have manifolds that are capable of taking full advantage of these standard industrial fittings to keep a multiplicity of conduit lines extending from the manifold in an orderly configuration.

For purposes of a number of industrial applications, manufacturers of known and commercially available manifolds will often provide the manifolds to customers with a number of predrilled ports. Manifold manufacturers typically have relatively sophisticated and accurate equipment for drilling these ports. Accordingly, ports drilled by manufacturers, with relatively small tolerances, will often have a relatively lesser probability of leaks, than will ports drilled on-site of the manifold utilization. However, manifold users will often not know, at the time of manifold purchase, exactly how many ports will be necessary for their manifold applications. Further, as manifold user machinery is enhanced or otherwise modified, additional manifold ports may be required. Accordingly, it is desirable to provide the capability to manifold users of permitting, with relatively high accuracy, the drilling of additional taps without requiring dismantling of the manifold itself, or otherwise removing the manifold from associated machinery.

SUMMARY OF THE INVENTION

According to a preferred embodiment of the invention, a manifold for conducting a fluid between at least two conduits comprises a first section having a collet adapted to engage a clamping assembly for preventing rotation of the manifold relative to the clamping assembly about a longitudinal axis extending through the first section. The manifold also includes a second elongated section integrally connected to the first section and extending therefrom along the same longitudinal axis. The first section and the second section together have a substantially centrally positioned chamber extending along the longitudinal axis through the first section and the second section. The manifold in addition has at least two planar surfaces located radially of the longitudinal axis, with one of the planar surfaces disposed at an angle of 45 degrees relative to another of the planar surfaces. At least one of the planar surfaces has a port in open communication with the chamber.

In one aspect of the invention, one of the planar surfaces has a plurality of ports in open communication with the chamber. Preferably, the ports are disposed in a rank parallel to the longitudinal axis.

In another aspect of the invention, the first section has an end with an opening in communication with the chamber, and the collet is spaced from the end to form a first annular shoulder between the end and the collet. The collet is further spaced from the second section to form a second annular shoulder between the collet and the second section. Preferably, the first and second sections are octagonal in cross section and formed of a single piece of extruded metal.

In yet another aspect of the invention, a groove is provided along the longitudinal centerline of one of the planar surfaces.

The invention thus provides a lightweight, durable, relatively inexpensive, yet strong manifold which is capable of taking full advantage of standard industrial fittings to maintain conduit lines in an orderly configuration, taking up a minimum of space, and providing a flexibility to connect to conventional clamping systems.

BRIEF DESCRIPTION OF THE DRAWINGS

The invention will now be described with reference to the accompanying drawings, in which.

DETAILED DESCRIPTION OF THE PREFERRED EMBODIMENT

The principles of the invention will now be described, by way of example, in a manifold 10 as illustrated in FIGS. 1-4. As explained in detail in subsequent paragraphs herein, the manifold 10 is adapted to direct a flow of fluid (including gas) between a source and multiple conduits. The manifold 10 is of integral or unitary construction, and is preferably formed of a single piece of extruded aluminum, generally octagonal in cross section.

The manifold 10 comprises, generally, a first section 12 and a second section 14. The first section 12 is adapted to be received in a clamping assembly 16, as shown in FIGS. 2 and 3, and the second section 14 is adapted to direct a fluid or gas through one or more conduits, as will be described in greater detail in subsequent paragraphs herein.

Figure 1:
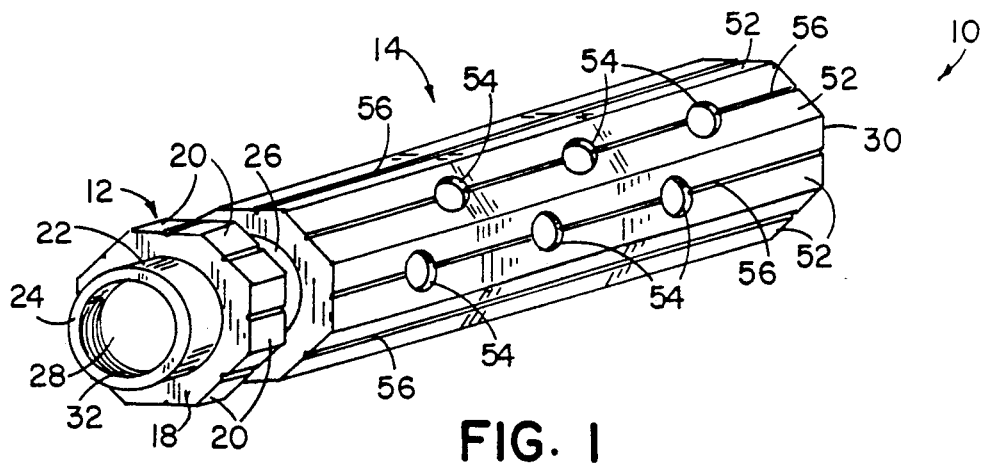
FIG. 1 is a perspective view of an illustrative embodiment of a manifold in accordance with the invention.
Figure 3:
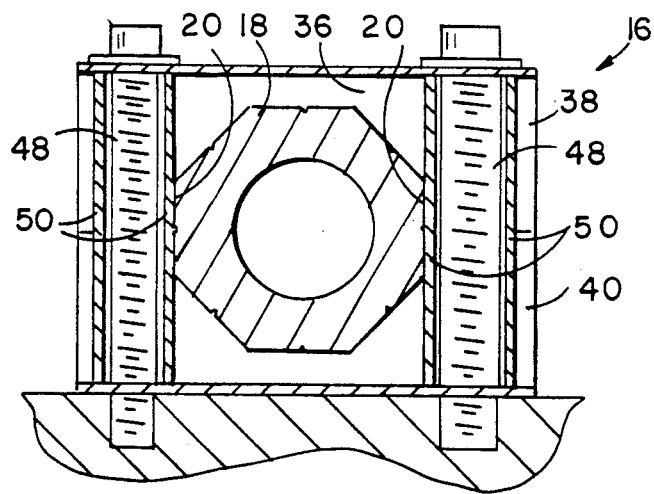
FIG. 3 is a cross-sectional view taken along lines 3—3 of FIG. 2.

As shown in FIGS. 1 and 3, the first section 12 comprises a collet 18 having a plurality of clamping faces 20 thereon. As shown in FIGS. 1 and 2, a first annular shoulder 22 is provided between the collet 18 and a first end 24 of the manifold 10. A second annular shoulder 26 is provided between the collet 18 and the second section 14. The first and second annular shoulders 22, 26 are preferably formed by turning a single piece of extruded aluminum.

As primarily shown in FIG. 1, the manifold 10 is provided with a central bore 28 which extends longitudinally from the first end 24 through a second end 30 of the manifold 10. The first end 24 has internal threads 32 to receive a standard industrial fitting, and the second end 30 also has internal threads (not shown) to receive a similar standard fitting. For example, a nipple can be fitted into the first end 24 so the manifold 10 can be adapted to mount to a machine or to another manifold. Alternatively, a single plug (not shown) can be threaded into the end 30 to provide a cap at the end of the bore 28 so fluid may be prevented from exiting through the end. Thus, flexibility is provided in order to mount one or more manifolds 10 in different configurations as the needs of a particular application may warrant.

Figure 2:
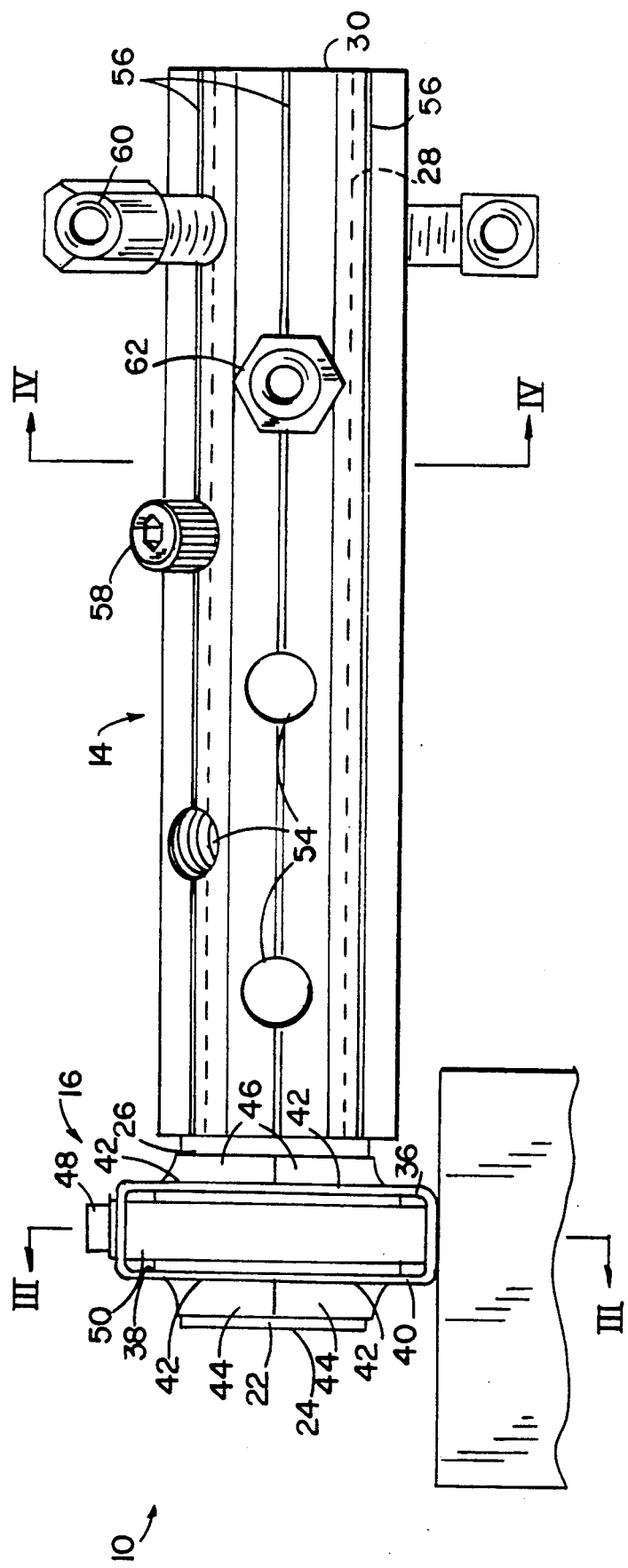
FIG. 2 is a side elevational view of the manifold of FIG. 1, with a clamping assembly secured thereon, and fittings installed in certain of the ports.

Referring now to FIGS. 2 and 3, the clamping assembly 16 may comprise a clamp 36 manufactured by Hydro-Craft, Inc., as illustrated. The clamp 36 comprises an upper yoke 38 and a lower yoke 40. Each yoke 38, 40 has a saddle 42 formed on an open side of the corresponding yoke which is complementary in shape and dimension to the first annular shoulder 22 and the second annular shoulder 26. Flanges 44, 46 extend from each side of the saddle 42 of each yoke 38, 40. The manifold 10 is mounted in the clamp 36 such that the collet 18 is received within each yoke 38, 40, and the first and second annular shoulders 22, 26 are seated in the saddle 42. The flange 44 on each of the upper yoke 38 and lower yoke 40 thus collars and secures the first annular shoulder 22, and the flange 46 on each of the upper yoke 38 and lower yoke 40 collars and secures the second annular shoulder 26. Bolts 48 extend through the upper yoke 38 and the lower yoke 40 within spacers 50, for purposes of securing together the upper and lower yokes 38, 40, respectively. The bolts 48 may also extend into a surface of a machine 49 to serve as a means to mount the clamping assembly to the machine. As shown in FIG. 3, a bolt 48 and spacer 50 are provided on each side of the collet 18. It will be apparent that the bolts 48 and spacers 50 are spaced apart from each other such that a clamping face 20 of the collet 18 is immediately adjacent to and in contact with a spacer 50. Thus, the manifold 10 is prevented from rotating within the clamp 36.

The clamp 36 can be provided with spaced multiple saddles with corresponding bolts and spacers, such that more than one manifold 10 can be mounted in a side-by-side configuration. It is preferred that the shape of the collet 18 in cross section be such that two opposite clamping faces 20 are parallel. Prior art manifolds required fittings which were generally hexagonal or square in cross section in order to readily adapt to fit in such a clamp. Preferably, the shape of the collet 18 in cross section according to the invention is octagonal in accordance with the integral construction of the manifold 10. The octagonal construction provides the preferred parallel clamping faces 20.

Referring again to FIG. 1, the second section 14 has an octagonal cross section identical to the collet 18 by virtue of the fact that the manifold 10 is made from a single piece of extruded aluminum. Thus, the second section 14 is provided with adjacent planar surfaces 52 which are at an angle of 45° with respect to each other. One or more ports 54 may be provided in any of the planar surfaces 52. The ports 54 are in open communication with the central bore 28. Preferably, ports are provided in adjacent planar surfaces 52 for a purpose described hereinafter. Each planar surface 52 includes a groove 56 extending longitudinally of the manifold 10 along a centerline of the planar surface 52. Each port 54 is provided by drilling a tapped aperture of standardized dimensions along the centerline of the planar surface 52. The groove 56 facilitates the placement of the port 54 along the centerline. This is particularly useful where a manifold 10 is already installed in the field, and an additional port 54 is desired on a planar surface 52 that has not been predrilled prior to installation of the manifold 10.

Referring again to FIG. 2, the manifold 10 is shown with three visible ports 54 open. The remaining ports are occupied. The ports 54 are preferably adapted to receive standardized industrial fittings. Unused ports 54 may be closed with a plug 58. A 45° fitting 60, a straight fitting 62, and a 90° fitting 64 are shown mounted to the second section 14 of the manifold 10 in FIG. 2. To illustrate a typical use, the first end 24 may also have a standard fitting or receive a mounting lug (not shown), whereby the manifold 10 can be mounted to a machine. The second end 30 may be fitted with a plug or a fitting (not shown) to facilitate mounting a second manifold in tandem. Fluid (or gas) will then be directed from an external source through the first end 24 into the central bore 28 and then out through unplugged ports 54. The fittings such as those at 60, 62, and 64 are adapted to connect to conduits (not shown) for directing the fluid (or gas) to the point of application. Conversely, the direction of flow may be reversed. It is therefore sometimes useful, for example, to mount two manifolds 10 in an expanded clamp 36, side by side. One may serve for output, while the other may serve for input.

Figure 4:
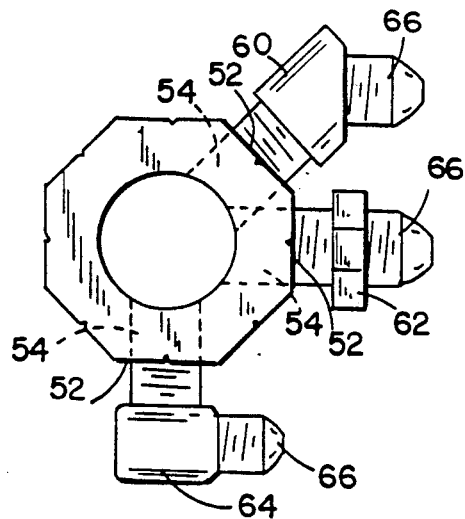
FIG. 4 is a cross-sectional view taken along lines 4—4 of FIG. 2.

Referring now to FIG. 4, it can be seen that the octagonal cross section of the manifold 10 will particularly facilitate the orderly distribution of conduits extending from the outlet ports 54. Because adjacent planar surfaces 52 are at 45° with respect to each other, and because standardized industrial fittings are typically made commercially available in equal increments of 45°, all conduit lines (not shown) which may be desired in a given configuration can be made to lead from the manifold 10 parallel to each other. Thus, significantly less space is used than is required for existing manifolds. In FIG. 4, a 45° fitting 60 is mounted in a port 54 on a planar surface 52. A straight fitting 62 is mounted in a port 54 on an adjacent planar surface 52, and a 90° fitting is mounted on yet another adjacent planar surface 52. Thus, each fitting 60, 62, and 64 has an adapter portion 64 for connecting to a conduit (not shown) which is parallel to another. The shape of the manifold 10 thus provides substantial flexibility in adapting standardized fittings to different applications in an efficient manner.

Preferably, the surface of the manifold 10 is anodized in order to minimize corrosion and also to facilitate coloring of the manifold 10. It is customary to "color code" manifolds, depending upon the particular utilizations of the manifolds. For example, manifolds are sometimes colored red to denote warm water, black to denote cold water, and blue to denote compressed air.

It will be apparent that the invention provides an integral, lightweight, corrosion resistant manifold which is readily adaptable to be mounted in commonly used clamping systems. The integral construction and the planar surfaces where the ports are provided tend to minimize leaks. The octagonal cross-sectional configuration of the manifold provides a relatively simple, unique means of maintaining neat, orderly, and compact multiplicity of conduits which requires less space and less bending of the conduits. The invention also provides substantial flexibility, being adaptable to many different applications. Also, manifolds in accordance with the invention may be manufactured at relatively reduced costs, compared to known manifolds.

Reasonable variations and modifications are possible within the spirit of the foregoing specification and drawings, without departing from the scope of the invention which is defined in the accompanying claims.

The embodiments of the invention in which an exclusive property or privilege is claimed are defined as follows:

1. A manifold for conducting a fluid between at least two conduits, the manifold comprising:
    a first section having engagement means adapted to engage a clamping assembly for preventing rotation of said manifold;
    a second section integrally connected to the first section, said first section and said second section together having a substantially centrally positioned chamber extending through the first section and the second section and at least two planar surfaces located radially of the chamber, one of said at least two planar surfaces disposed at an angle of 45 degrees relative to another of said two planar surfaces, at least one of said at least two planar surfaces having at least one port in open communication with said chamber;
    said second section being elongated in a longitudinal direction, and each of said planar surfaces having a groove along a longitudinal centerline thereof.

2. In a manifold for conducting a fluid through at least two conduits comprising:
    a prismatoid structure having an opening at one end thereof and defining a chamber in open communication with said opening, said structure having at least two adjacent planar surfaces, with one of said planar surfaces having at least one port adapted to receive a fitting in open communication with said chamber, the improvement which comprises:
    said prismatoid structure being a prismoid, octagonal in cross section and elongated wherein each of said planar surfaces has a groove along the longitudinal centerline thereof; and
    collet means integral with said structure and receivable in the clamping means, wherein said structure can be prevented from rotating with respect to said clamping means when said structure is received in said clamping means.

3. A manifold for conducting a fluid between at least two conduits, the manifold comprising:
   a first section having a collet adapted to engage a clamping assembly for preventing rotation of the manifold relative to the claimping assembly about a longitudinal axis extending through the first section;
   a second elongated section integrally connected to the first section and extending therefrom along said longitudinal axis, said first section and said second section together having substantially centrally positioned chamber extending along said longitudinal axis through said first section and second section, and at least two planar surfaces located radially of said longitudinal axis, one of the planar surfaces disposed at an angle of 45 degrees relative to another of the planar surfaces; and
   at least one of the planar surfaces having a port in open communication with the chamber.

4. A manifold according to claim 3 wherein one of the planar surfaces has a plurality of ports in open communication with the chamber, said ports being disposed in a rank parallel to the longitudinal axis.

5. A manifold according to claim 3 wherein the first section has an end with an opening in communication with the chamber, the collet is spaced from the end to form a first annular shoulder between the end and the collet, and the collet further is spaced from the second section to form a second annular shoulder between the collet and the second section.

6. A manifold according to claim 3 wherein the first section and second section are octagonal in cross section and formed of a single piece of extruded metal.

7. A manifold for conducting a fluid between at least two conduits, the manifold comprising:
   a first section having engagement means adapted to engage a claimping assembly for preventing rotation of the manifold;
   a second section elongated in a longitudinal direction and integrally connected to the first section, said first section and said second section being octagonal in cross section and together having a substantially centrally positioned chamber extending through said first section and said second section and at least two planar surfaces located radially of said chamber, one of the planar surfaces disposed at an angle of 45 degrees relative to another of the planar surfaces; and
   at least one of the planar surfaces having a port in open communication with the chamber and a groove along the longitudinal centerline thereof.

8. A manifold for conducting a fluid between at least two conduits, the manifold comprising:
   a first section having engagement means adapted to engage a clamping assembly for preventing rotation of the manifold;
   a second section elongated in a longitudinal direction and integrally connected to the first section, said first section and said second section together having a substantially centrally positioned chamber extending through the first section and the second section and at least two planar surfaces located radially of the chamber, one of the planar surfaces disposed at an angle of 45 degrees relative to another the planar surfaces; and
   at least one of the planar surfaces having a pot in open communication with the chamber and a groove along a longitudinal centerline of the planar surface.

9. In a manifold for conducting a fluid between at least two conduits comprising:
   a prismatoid structure having an opening at one end thereof and defining a chamber in open communication with said opening, said structure having at least two adjacent planar surfaces, with one of said planar surfaces having at least one port adapted to receive a fitting in open communication with said chamber, the improvement which comprises:
   said prismatoid structure being an elongated prismoid, octagonal in cross section;
   collet means integral with said structure and receivable in the clamping means, wherein said structure can be prevented from rotating with respect to said clamping means when said structure is received in said clamping means; and
   each of said planar surfaces has a groove along the longitudinal centerline thereof.

* * * * *

UNITED STATES PATENT AND TRADEMARK OFFICE
CERTIFICATE OF CORRECTION

PATENT NO. : 5,090,740

DATED : February 25, 1992

INVENTOR(S) : Richard F. Creager et al.

It is certified that error appears in the above-identified patent and that said Letters Patent is hereby corrected as shown below:

Column 8, claim 8, line 23:
"pot" should be --port--.

Signed and Sealed this

Twenty-eighth Day of September, 1993

Attest:

BRUCE LEHMAN

Attesting Officer

Commissioner of Patents and Trademarks